Dec. 27, 1932.  P. LEMAIGRE  1,892,660
SPRING SUSPENSION FOR MOTOR VEHICLES
Filed Oct. 20, 1928
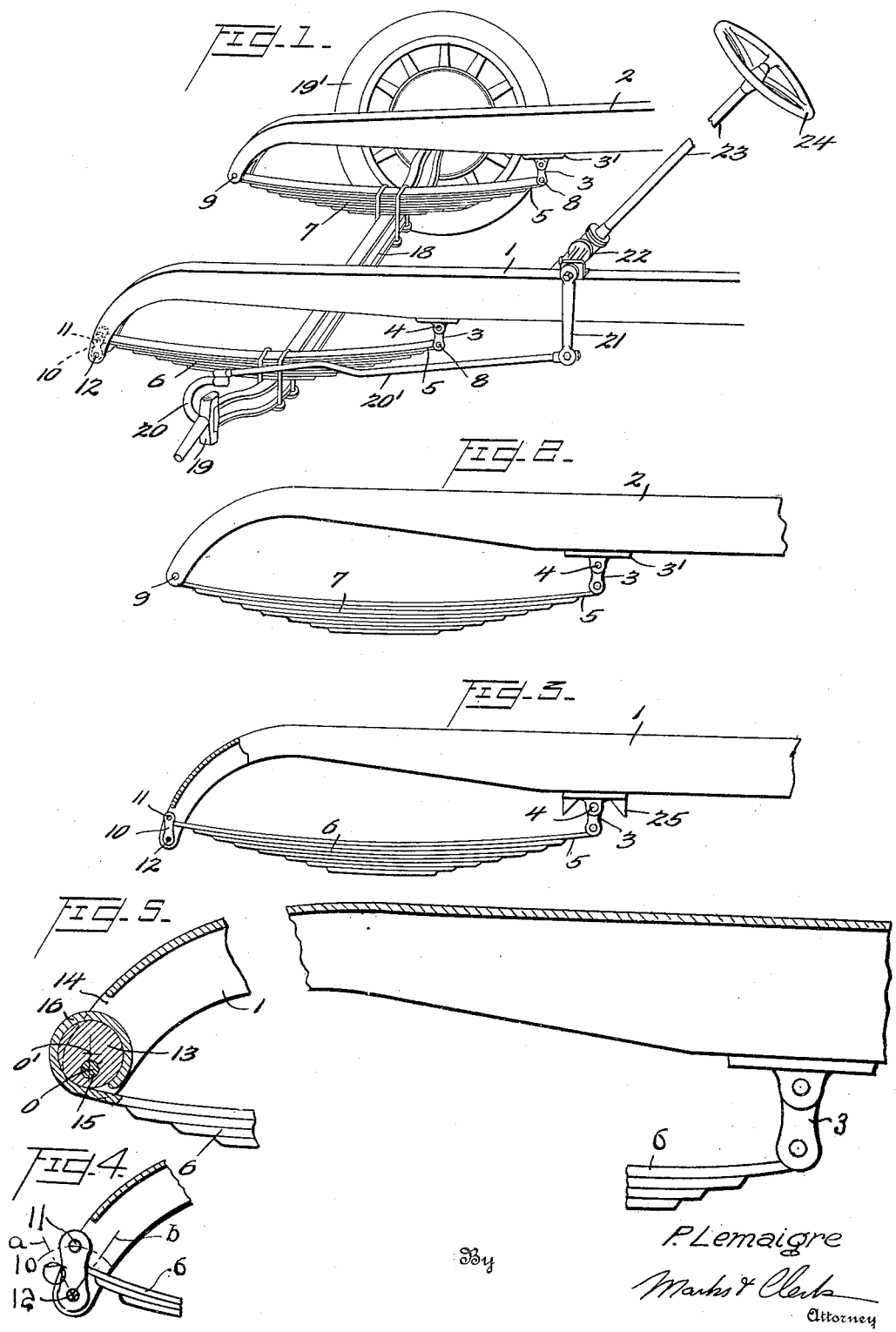
P. Lemaigre
Marks & Clerk
Attorney Patented Dec. 27, 1932

1,892,660

UNITED STATES PATENT OFFICE

PIERRE LEMAIGRE, OF ST. DENIS, FRANCE, ASSIGNOR, BY MESNE ASSIGNMENTS, TO MILTON TIBBETTS, TRUSTEE

SPRING SUSPENSION FOR MOTOR VEHICLES

Application filed October 20, 1928. Serial No. 313,797.

This invention relates to motor vehicles and particularly to the means for supporting the frame on the axle. It is more especially adapted to the steering or front axle of the vehicle and will be so described.

Since the introduction some years ago of so-called balloon or semi-balloon tires on motor vehicles more or less difficulty has been encountered with unsteadiness of the parts of the vehicle supported by the steering or front axle or in the axle itself and its associated parts such as the front wheels and steering connections. This unsteadiness in its various forms is commonly referred to as "shimmy", "wheel wabble", "tramping", etc. It causes serious kick-back through the steering gear and is frequently dangerous. It has been the subject of much debate and of considerable engineering research and changes in design and construction of parts and connections. But to obtain soft and easy steering, while at the same time eliminating the unsteadiness under all conditions of road travel has continued to be elusive.

One of the objects of the present invention is to provide a construction that will eliminate this difficulty and bring the parts into such relationship that shimmy or similar action will be prevented or controlled so that there will be no ill effects felt by the driver or the occupants of the vehicle.

Another object of the invention is to provide a construction that will permit slight yielding, frictionally retarded perhaps, of one of the spring connections under some conditions so that the movement of the axle may accommodate itself more nearly to the arc of the steering connecting rod or drag link and thereby prevent deflection of the wheels or steering knuckles under certain road conditions.

Another object of the invention is to provide a yielding connection of the spring to the frame at one side of the vehicle which is different in its action from the connection on the other side whereby to break up the otherwise synchronous action that may be started in the frame and axle connections and which is sometimes the cause of the shimmy started by uneven road or other similar conditions.

Another object of the invention is to provide means for connecting the end of one of the springs supporting the frame on the axle and which in the usual construction has been pivoted to the frame at a fixed point, with a yielding pivot held in a neutral position through the action of yielding resistance means. Such a connection is provided at the end of one of the springs, the corresponding end of the other spring being connected to the frame by the usual fixed pivot. Such construction acts to break up synchronous vibratory movement of the parts of the vehicle directly supported by the axle or of the axle or any of its component parts. Such movements have been referred to as "shimmying", "wheel wabble", "tramping", etc.

Another object of this invention is to provide means of attaching one of the front springs to obtain a slight resilient movement of the front axle from front to back and from back to front, so as to eliminate the reactions of steering and of swinging. In the construction shown, which is more particularly applicable to vehicles the front springs of which are fitted with shackles at their rear ends, the front end of one of the springs is attached to its side frame member in such a way as to be able to become slightly displaced with respect to said side frame member by an inverted shackle or any similar device comparable with a jointed connecting rod, the lower end of which is attached to the side frame member and the upper end to the spring, and which always tends to return to its position of equilibrium by the weight of the underframe. There is thus obtained a sort of resilient displacement of the front axle.

Other objects of the invention will appear from the following description taken in connection with the drawing, which forms a part of this specification, and in which:

Fig. 1 is a perspective view of the invention;

Fig. 2 is a side view of the spring and frame connection shown at the far side of Fig. 1;

Fig. 3 is a similar view of the spring and frame connection shown at the near side of Fig. 1, and Fig. 4 is a cross-sectional view of a detail on an enlarged scale showing the cooperating parts broken away.

Fig. 5 is a cross-sectional view showing a modification of the invention.

On the drawing (Figs. 1 to 4), 1 and 2 are front ends of the respective side frame members of a chassis of a motor vehicle. Each side frame member is provided with a spring connection which permits the spring to freely move relative to the frame as the spring is flexed. Thus there are brackets 3′ secured on the side frame members to which one end of the shackle links 3 are secured by means of the bolt 4. To the other ends of the shackle links 3 are secured the rear ends 5 of the leaf spring assemblies 6 and 7 by means of bolts 8 passing through the bolt openings formed in said links and the spring assemblies. The forward end of the leaf spring assembly 7 is pivotally mounted on the end of the side frame member 2 by a bolt 9 passing through the eye in the spring and the ears of the side frame member 2. This provides a fixed and immovable pivot for this spring relative to the frame member 2. The front end of the spring assembly 6 is secured to the corresponding end of the side frame member 1 by means of a link 10 secured to the spring and side frame member by bolts 11 and 12. The relation of the points of attachment of the spring assembly 6 and the side frame member 1 is that in normal position the point of attachment of the side frame member to the links lies vertically below the point of connection of the spring assembly to the other end of the links. By this construction upon flexure of the spring assembly 6, this spring can move slightly longitudinally of the side frame member by a movement of the upper end of the link 10 on the arc $a$—$b$, and as the lower end of the link is the point at which the weight of the frame is applied to the link, when the link 10 is shifted in either direction towards $a$ or $b$ by reason of road conditions, the weight of the side frame member will tend to restore the link to its normal vertical position. It is this constant return to the normal position which characterizes the resilient displacement.

In the operation of the structure so far described the spring assembly 7 on one side of the vehicle is flexed about the fixed pivot 9 and the movable link 3 and the spring assembly 6 on the other side of the vehicle can be flexed about the two movable links 10 and 3.

The weight of the vehicle supported on the lower end of the link 10 is such that there will be practically no rocking movement of link 10 when the vehicle is travelling over a substantially smooth road. Under smooth road conditions, therefore, there is substantially no shifting of the front end of the spring assembly 6 relative to the frame, but under shock conditions of any magnitude whatever there is a deflection of the link 10 and a consequent shifting of the front end of the spring 6 relative to the frame under the controlling action of the weight of the vehicle.

In Fig. 5 is shown a modification of the invention in which the means for attaching the spring assembly 6 to the front end of the side frame member 1 comprises an eccentric 13 secured between ears 14 on the side member 1 by means of a pivot 15. The spring assembly 6 has its front end terminating in an eye 16 through which the eccentric 13 passes with a turning fit.

The eccentric is so positioned that pivot 15 is vertically below the center $o'$ of the eccentric.

In this modification the operation is similar to that described in Figures 1 to 4 as the distance from the center $o$ of the pivot and the center $o'$ of the eccentric operates as a link to permit a shifting of the end of the spring 6 longitudinally of the side frame member and a return to normal due to the weight of the vehicle acting on the pivot 15 which lies below the center $o'$ of the eccentric. A further characteristic of the form of the invention illustrated in this figure consists in that the eccentric mounting 13 constitutes a shorter link than the link 3 at the opposite end of the spring.

In the exceptional case in which the rear link might be shorter than the front link it is necessary, in order that the latter should always return to its vertical position of equilibrium, that the pivotal movement of the rear shackle should be limited by stops 25. In fact when the slant of the rear link tends to assume a certain value in front or in rear, the horizontal component on this link might become greater than the horizontal component tending to bring back the small front link into the vertical.

Extending transversely of the vehicle and secured to the springs 6 and 7 at intermediate points is the axle 18 having stub axles or steering knuckles 19 pivoted to the opposite ends thereof. The stub axles 19 carry wheels 19′ mounted thereon in the usual manner.

As a means for moving the stub axles coordinately on their pivots to accomplish steering of the vehicle there is provided a steering mechanism consisting of an arm 20 connected to each stub axle 19, 19, a steering connecting rod or drag link 20′ connected to the end of one of said arms and extending rearwardly therefrom, a lever 21 pivoted to the frame member 1 and connected to the other end of said drag link 20′ by means of which the stub axles can be moved, and means for moving said lever 21 comprising the mechanism 22 and the manually operated steering post 23 having the steering wheel 24 mounted thereon. The arms on the stub axles are also connected by the usual cross link to impart similar motion one to the other. Thus the steering connecting rod or drag link extends lengthwise of the frame adjacent the spring 6 and since the connection of the rear end of the drag link is not coincident with the pivotal connection 3 of the rear end of spring 6 the arcs of movement of the front end of the drag link about the rear end as an axis and of the axle about the rear end of the spring 6 as an axis, are necessarily not exactly the same. The slight difference in these arcs causes a movement of the steering knuckles laterally as the axle deflects the spring 6 and this, when violently attempted, is in part at least neutralized by the yielding of the front pivot of the spring 6 which thereby permits slight shifting of the rear end of the spring 6 relative to the frame, and less deflection of the steering knuckles or the wheels from a straight line, results.

In the construction above described it will appear that the spring suspension of the vehicle frame relative to the axle is accomplished on one side of the vehicle by means of a spring assembly secured to the frame member at one end by a shackle means and at the other end by a fixed pivot, and on the other side of the vehicle by a spring mounted in a similar manner except that in place of a fixed pivot there is provided a pivotal mounting for the spring in which the pivotal axis of the spring is capable of being displaced under varying conditions of travel of the vehicle. By the use of the combination above described it has been found that the usual faults obtained with other spring mountings are avoided and there will occur none of the so-called "shimmying", "wheel wabble", "tramping", etc., which are so annoying to the user of motor vehicles.

Having now particularly described and ascertained the nature of my said invention and in what manner the same is to be performed, I declare that what I claim is:

1. In a motor vehicle, the combination with the frame and the axle, of side supporting springs between the frame and axle, means connecting the spring to the frame at one side of the vehicle providing movement of the axle about a definite axis on the frame, and means connecting the spring to the frame at the other side of the vehicle providing movement of the axle about an axis shiftable slightly lengthwise of the vehicle against the action of the weight of the part of the vehicle supported by the spring.

2. In a motor vehicle, the combination with the frame and the axle, of a pair of supporting springs rigidly connected intermediate their ends to the axle, shackle connections between corresponding ends of said springs and the frame, a direct pivotal connection between the opposite end of one of said springs and the frame, and a yielding connection between the opposite end of the other of said springs and the frame, said yielding connection comprising a link secured to said frame and spring whereby the weight of the vehicle supported thereby tends to hold said connection in a neutral position.

3. In a motor vehicle, the combination with the frame and the axle, of a pair of supporting springs rigidly connected intermediate their ends to the axle, shackle connections between corresponding ends of said springs and the frame, a direct pivotal connection between the opposite end of one of said springs and the frame, and a yielding connection between the opposite end of the other of said springs and the frame, said yielding connection comprising a vertical link secured at its upper end to said spring and at its lower end to said frame.

4. In a motor vehicle, the combination with the frame and the axle, of side supporting springs between the frame and axle, means connecting the spring to the frame at one side of the vehicle providing movement of the axle about a definite axis on the frame, and means connecting the spring to the frame at the other side of the vehicle providing movement of the axle about an axis shiftable slightly lengthwise of the vehicle, the last mentioned connecting means being held at least partly in suspension and thereby normally retained in a position of equilibrium by the weight of the frame.

5. In a motor vehicle, the combination with the frame and the axle, of a pair of supporting springs rigidly connected intermediate their ends to the axle, shackle connections between the corresponding ends of said springs and the frame, a direct pivotal connection between the opposite end of one of said springs and the frame, and a yielding connection between the opposite end of the other spring and the frame, at least one of the connections of the second mentioned spring being held in suspension between said spring and the frame whereby the weight of the frame is utilized to yieldably maintain said connection in a neutral position.

6. In a motor vehicle, the combination with the frame and the axle, of a pair of supporting springs rigidly connected intermediate their ends to the axle, shackle connections between corresponding ends of said springs and the frame, a direct pivotal connection between the opposite end of one of said springs and the frame, and a yielding connection between the opposite end of the other of said springs and the frame, said yielding connection comprising an eye formed on the end of the spring, an eccentric mounted to have a turning fit in said eye, a pivot securing said eccentric to said frame, the point of connection of said eccentric to the frame in neutral position lying vertically below the center of said eccentric.

7. In a motor vehicle, the combination with the frame and the axle of a pair of supporting springs rigidly connected intermediate their ends to the axle, shackle connections between corresponding ends of said springs and the frame, a direct pivotal connection between the opposite end of one of said springs and the frame, and a yielding connection between the front end of the other of said springs and the frame, said yielding connection comprising an eye formed on the end of the spring, an eccentric mounted to have a turning fit in said eye, a pivot securing said eccentric to said frame, the point of connection of said eccentric to the frame in neutral position lying vertically below the center of said eccentric.

8. In a motor vehicle, the combination with the frame and the axle of a pair of supporting springs rigidly connected intermediate their ends to the axle, shackle connections between the corresponding ends of said springs and the frame, a direct pivotal connection between the opposite end of one of said springs and the frame, and a yielding connection between the opposite end of the other of said springs and the frame, said yielding connection comprising a link shorter than the shackle connection of said spring.

In testimony whereof I affix my signature.

PIERRE LEMAIGRE.